(12) United States Patent
Tang et al.

(10) Patent No.: US 11,037,736 B2
(45) Date of Patent: Jun. 15, 2021

(54) LITHIUM ION CAPACITOR

(71) Applicant: NATIONAL INSTITUTE FOR MATERIALS SCIENCE, Ibaraki (JP)

(72) Inventors: Jie Tang, Ibaraki (JP); Yige Sun, Ibaraki (JP); Luchang Qin, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 47 days.

(21) Appl. No.: 16/484,491

(22) PCT Filed: Jan. 24, 2018

(86) PCT No.: PCT/JP2018/002048
§ 371 (c)(1),
(2) Date: Aug. 8, 2019

(87) PCT Pub. No.: WO2018/147080
PCT Pub. Date: Aug. 16, 2018

(65) Prior Publication Data
US 2019/0371533 A1  Dec. 5, 2019

(30) Foreign Application Priority Data

Feb. 13, 2017 (JP) .............................. JP2017-024150

(51) Int. Cl.
*H01G 11/06* (2013.01)
*C04B 35/83* (2006.01)
(Continued)

(52) U.S. Cl.
CPC ............. *H01G 11/06* (2013.01); *C04B 35/83* (2013.01); *H01G 11/26* (2013.01); *H01G 11/36* (2013.01);
(Continued)

(58) Field of Classification Search
CPC ........ H01G 11/50; H01G 11/06; H01G 11/26; H01G 11/34; H01G 11/36; H01G 11/52;
(Continued)

(56) References Cited

U.S. PATENT DOCUMENTS

2016/0133394 A1* 5/2016 Sakshaug ................ C01B 32/05
361/502
2016/0365199 A1  12/2016 Tang et al.
2018/0297850 A1* 10/2018 Tour ...................... H01M 4/663

FOREIGN PATENT DOCUMENTS

CN    103680972     3/2014
CN    103896240     7/2014
WO   2015/129820    9/2015

OTHER PUBLICATIONS

International Search Report dated Apr. 17, 2018 in International Application No. PCT/JP2018/002048.
(Continued)

*Primary Examiner* — Michael P McFadden
(74) *Attorney, Agent, or Firm* — Wenderoth, Lind & Ponack, L.L.P.

(57) ABSTRACT

The present invention provides a lithium ion capacitor (LIC) that achieves high specific capacity and high energy density. The lithium ion capacitor according to the present invention includes a cathode, an anode arranged apart from the cathode, and a Li-ion electrolyte with which a space between the cathode and the anode is filled. The cathode is made of a composite of graphene and carbon nanotubes, the anode is made of a Li-doped composite of graphene and carbon nanotubes, and the mass ratio of the anode to the cathode is larger than 0 and less than 1.0.

9 Claims, 8 Drawing Sheets (51) Int. Cl.
  *H01G 11/26* (2013.01)
  *H01G 11/36* (2013.01)
  *H01G 11/50* (2013.01)
  *H01G 11/62* (2013.01)
  *H01G 11/86* (2013.01)
  *B82Y 30/00* (2011.01)

(52) U.S. Cl.
  CPC .............. *H01G 11/50* (2013.01); *H01G 11/62* (2013.01); *H01G 11/86* (2013.01); *B82Y 30/00* (2013.01); *C04B 2235/422* (2013.01); *C04B 2235/5288* (2013.01); *C04B 2235/5292* (2013.01)

(58) Field of Classification Search
  CPC ........ H01G 11/86; H01G 11/62; H01G 11/38; H01G 11/66; C01B 32/194; C01B 32/225; C01B 32/354; C01B 2204/22; C01P 2006/40; C04B 35/83; C04B 2235/422; C04B 2235/5288; C04B 2235/5292; B82Y 30/00; H01M 4/583; H01M 4/136; H01M 4/5815; H01M 4/621; H01M 4/624; H01M 4/64
  See application file for complete search history.

(56) References Cited

OTHER PUBLICATIONS

Sun et al. "Hybrid lithium-ion capacitors with asymmetric graphene electrodes", Journal of Materials Chemistry A, 2017, 5, p. 13601-13609.

Office Action dated Nov. 3, 2020 in corresponding Chinese Patent Application No. 201880010157.9, with English Translation.

\* cited by examiner

LITHIUM ION CAPACITOR

TECHNICAL FIELD

The present invention relates to a lithium ion capacitor using a composite of graphene and carbon nanotubes.

BACKGROUND ART

As a hybrid capacitor having both of the characteristics of an electric double-layer capacitor (EDLC) and a lithium ion battery (LIB), a lithium ion capacitor (LIC) has been attracting attention.

A lithium ion supercapacitor using a composite of graphene and carbon nanotubes as an electrode is known (Patent Literature 1). In Patent Literature 1, a full-cell type lithium ion supercapacitor that uses a composite of graphene and carbon nanotubes as a cathode and a Li-doped composite of graphene and carbon nanotubes as an anode has been reported, however, further improvement in the specific capacity and the energy density has been demanded.

CITATION LIST

Patent Literature

Patent Literature 1: WO 2015/129820 A

SUMMARY OF INVENTION

Technical Problem

An object of the present invention is to provide a lithium ion capacitor (LIC) that achieves high specific capacity and high energy density.

Solution to Problem

The lithium ion capacitor according to the present invention includes a cathode, an anode arranged apart from the cathode, and a Li-ion electrolyte which is filled between the cathode and the anode. The cathode is made of a composite of graphene and carbon nanotubes, the anode is made of a Li-doped composite of graphene and carbon nanotubes, and a mass ratio of the anode to the cathode is larger than 0 and less than 1.0. Thereby, the above-described problem can be solved.

The mass ratio of the anode to the cathode may be in a range of 0.15 or more and less than 0.8.

The mass ratio of the anode to the cathode may be in a range of 0.15 or more and less than 0.6.

In the composite constituting the cathode and the composite constituting the anode, the carbon nanotubes may be contained in a range of 17 wt % or more and less than 33 wt %.

In the composite constituting the cathode and the composite constituting the anode, the carbon nanotubes may be contained in a range of 20 wt % or more and less than 30 wt %.

In the composite constituting the cathode and the composite constituting the anode, the carbon nanotubes may be positioned between graphene layers.

The graphene may have a thickness in a range of 0.34 nm or more and less than 10 nm.

The graphene may have a lateral length in a range of 100 nm or more and less than 10 μm.

In the composite constituting the cathode and the composite constituting the anode, the carbon nanotube may be a single-walled carbon nanotube (SWNT).

The carbon nanotube may have a tube length of 100 nm or more and less than 10 μm.

The Li-ion electrolyte may contain one or more substances selected from a group consisting of $LiClO_4$, $LiPF_6$, $LiBF_4$, $LiPOF_2$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$.

Advantageous Effects of Invention

The lithium ion capacitor (LIC) according to the present invention uses a composite of graphene and carbon nanotubes for a cathode and an anode, and the composite for the anode is further doped with lithium. In such a combination of the cathode and the anode, by controlling the mass ratio of the anode to the cathode to more than 0 and less than 1.0, the specific capacity and the energy density of the LIC can be improved. In particular, by controlling the mass ratio to 0.15 or more and less than 0.8, and more preferably 0.15 or more and less than 0.6, the higher specific capacity and the higher energy density of the LIC can be achieved.

DESCRIPTION OF EMBODIMENTS

Hereinafter, the embodiments of the present invention will be described by referring to drawings. Note that the same elements are given the same numbers, and the description thereof is omitted. The inventors of the present application have focused on the mass ratio of an anode to a cathode, and have found that by making the mass of an anode and the mass of a cathode asymmetric, the specific capacity and the energy density of the lithium ion capacitor are improved.

Figure 1:
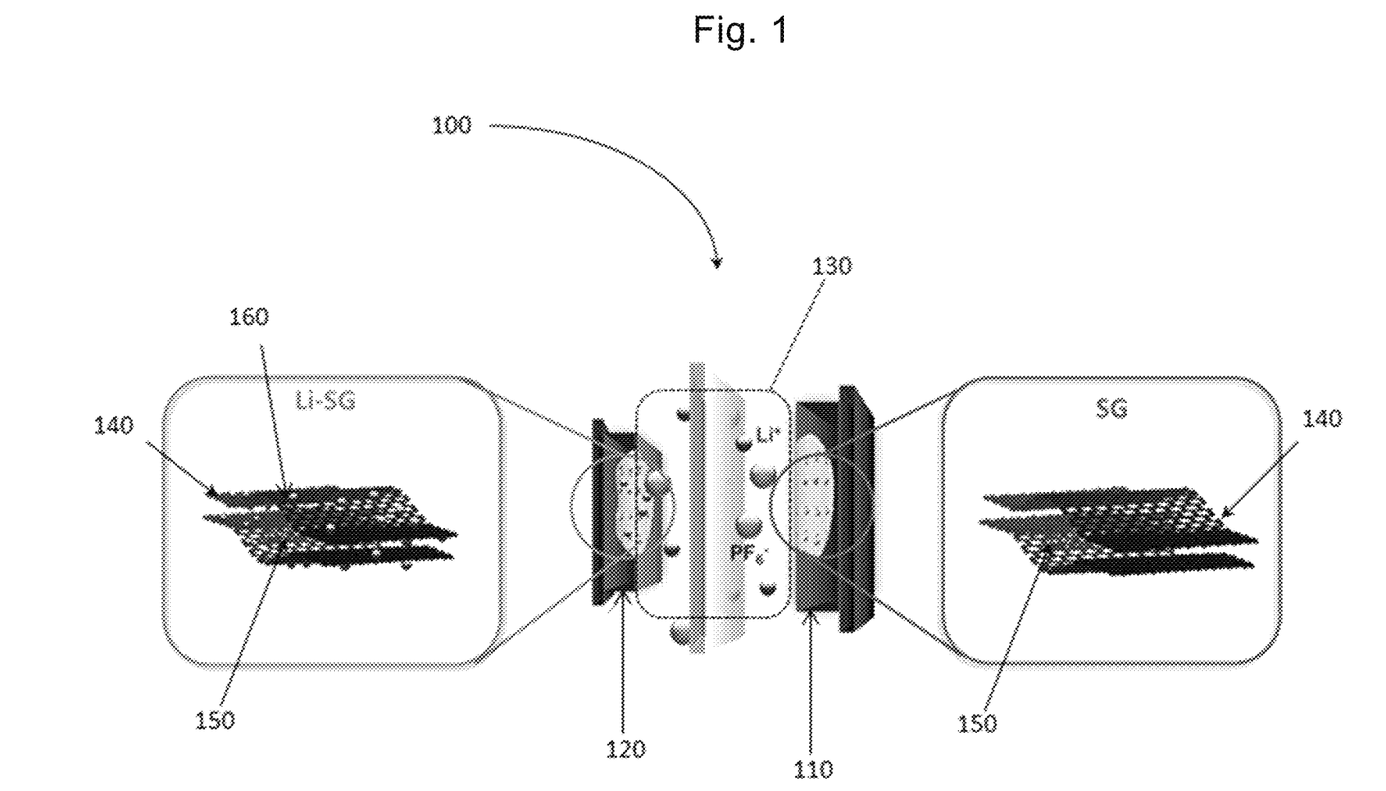
FIG. 1 is a schematic view showing a lithium ion capacitor (LIC) according to the present invention.

FIG. 1 is a schematic view showing a lithium ion capacitor (LIC) according to the present invention.

The lithium ion capacitor (hereinafter, simply referred to as "LIC") 100 according to the present invention includes a cathode 110, an anode 120 arranged apart from the cathode 110, and a Li-ion electrolyte 130 which is filled between the cathode 110 and the anode 120.

The cathode 110 is made of a composite of graphene 140 and carbon nanotubes 150. On the other hand, although the anode 120 is made of a composite of graphene 140 and carbon nanotubes 150, the composite is doped with Li 160. Note that in the present specification, a composite of graphene and carbon nanotubes is simply referred to as "composite", and a composite doped with Li is referred to as "Li-doped composite".

Further, the LIC 100 according to the present invention is designed such that the mass of a cathode 110 and the mass of an anode 120 is asymmetric. In detail, the LIC 100 is designed such that the mass of an anode 120 is less than the mass of a cathode 110. That is, the mass ratio of a cathode 110 to an anode 120 satisfies larger than 0 and less than 1.0. In this way, the specific capacity and the energy density of a LIC 100 can be improved.

The mass ratio of a cathode 110 to an anode 120 preferably satisfies 0.15 or more and less than 0.8. In this way, the specific capacity and the energy density of a LIC 100 can be further improved.

The mass ratio of a cathode 110 to an anode 120 more preferably satisfies 0.15 or more and less than 0.6. In this way, the specific capacity and the energy density of a LIC 100 can be reliably improved.

In the composite constituting each of a cathode 110 and an anode 120, carbon nanotubes 150 are positioned between layers of graphene 140. That is, the composite is in a state in which carbon nanotubes 150 are positioned between layers of graphene 140, and the carbon nanotubes 150 and the graphene 140 are assembled. By adopting such a structure, not only the specific surface area is increased, but also a space for facilitating the adsorption and desorption of electrolyte ions such as lithium ions is formed, and thus, the specific capacity and the energy density can be improved. In this regard, such a space has a pore diameter of 2 nm or more and less than 50 nm.

In the composite constituting each of a cathode 110 and an anode 120, the carbon nanotubes 150 are preferably contained in a range of 17 wt % or more and less than 33 wt %. If the content of the carbon nanotubes 150 is less than 17 wt %, the specific surface area is reduced, and if the content of the carbon nanotubes 150 exceeds 33 wt %, the exposed area of an active surface of the graphene 140 is reduced, and therefore, the energy density and the power density can be reduced.

In the composite constituting each of a cathode 110 and an anode 120, the carbon nanotubes 150 are preferably contained in a range of 20 wt % or more and less than 30 wt %. Within this range, the composite has a high specific surface area and a space for adsorption and desorption of lithium ions, and therefore, particularly high energy density and particularly high power density can be achieved.

In the composite constituting each of a cathode 110 and an anode 120, the graphene 140 has a thickness in a range of 0.34 nm or more and less than 10 nm. If the thickness is within this range, the graphene 140 is a single layer (having a thickness of 0.34 nm that is the theoretical lower limit) or is in a state of being exfoliated into several layers, and the active surface can be exposed. If the thickness of the graphene 140 is larger than 10 nm, the cathode 110/anode 120 may be broken with the adsorption and desorption of lithium ions.

In addition, the graphene 140 has a lateral length in a range of 100 nm or more and less than 10 μm. If the graphene 140 is in a sheet shape, a composite in which the carbon nanotubes 150 described above are positioned between the layers of the graphene 140 can be obtained. The graphene 140 may have a functional group such as a hydroxyl group, a carboxy group, or a carbonyl group in addition to a carbon atom within a range not inhibiting the properties.

In the composite constituting each of a cathode 110 and an anode 120, the carbon nanotube 150 is, for example, a single-walled carbon nanotube (SWCNT), or a multi-walled carbon nanotube (MWCNT) having two or more layers, and is preferably a single-walled carbon nanotube. If the carbon nanotube 150 is a single-walled carbon nanotube, the above-described composite is easily formed.

The carbon nanotube 150 preferably has a tube length of 100 nm or more and less than 10 μm, and has a tube diameter in a range of 1 nm or more and less than 10 nm. By having such a shape, the above-described composite is formed.

The Li-ion electrolyte 130 is not particularly limited as long as it is an existing electrolyte used for a lithium ion battery. For example, the Li-ion electrolyte 130 contains one or more substances selected from a group consisting of $LiClO_4$, $LiPF_6$, $LiBF_4$, $LiPOF_2$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$. Among them, $LiPF_6$ has high conductivity, and therefore, is preferred.

FIG. 1 shows a state in which each of a cathode 110 and an anode 120 is formed on a current collector. Further, a LIC 100 in FIG. 1 has a separator between the cathode 110 and the anode 120. As the current collector and the separator, a current collector and a separator, which are used in an ordinary LIC, are adopted. In addition, although a single cell is shown in FIG. 1, such a cell may be used for the connection in series or in parallel to form a LIC having the necessary voltage and capacity.

Exemplary methods for producing a composite and a Li-doped composite, which are used in the LIC 100 according to the present invention, will be described.

For example, as described in Patent Literature 1, a composite is formed by mixing graphene and carbon nanotubes and by performing filtration. In this regard, the graphene is obtained by exfoliating a graphite oxide produced from commercially available graphite powder by Brodie method, Staudenmaier method, Hummer method, an improved Hummers method, or the like, or a commercially available graphite oxide, by ultrasonic treatment, and then performing the reduction with the use of a reducing agent such as hydrazine hydrate or the like. Alternatively, a composite may be formed by mixing the graphite oxide obtained by exfoliating the above-described graphite oxide by ultrasonic treatment with carbon nanotubes, and then by performing reduction and performing filtration.

Next, an exemplary method for producing a Li-doped composite will be described.

For example, as described in Patent Literature 1, by using the composite produced in the above, doping of Li is performed by a half-cell electrochemical (EC) method, or an external short circuit (ESC) method. In this regard, it can be determined that Li doping has been performed when the electric potential of the anode reaches around 0 V (for example, 0.01 V). Herein, a produced Li-doped composite of graphene and carbon nanotubes (Li-doped composite) can be used as an anode 120 of a LIC 100 by removing the composite from the EC or ESC circuit.

Next, an exemplary method for producing a LIC 100 using the above-described composite and Li-doped composite will be described.

As an anode 120, a Li-doped composite is produced by an EC method or an ESC method and removed from the circuit, and then on the obtained Li-doped composite, a separator, and then the above-described composite as a cathode 110 are stacked in this order, and a Li-ion electrolyte 130 is filled between the cathode 110 and the anode 120. In this regard, the composite for the cathode 110 is applied onto the separator such that the mass ratio of the anode 120 to the cathode 110 is larger than 0 and less than 1.0.

Next, the present invention will be described in detail using specific Examples, however, it should be noted that the present invention is not limited to the following Examples.

EXAMPLES

Example 1

In Example 1, by using a composite of graphene and carbon nanotubes as a cathode, and using a composite obtained by doping a composite of graphene and carbon nanotubes with Li as an anode, a LIC having a mass ratio of the anode to the cathode of 0.4 was produced.

Prior to the production of a LIC, a composite of graphene and carbon nanotubes was produced. In a beaker, 3 g of graphite (median diameter: 7 to 10 μm, Alfa Aesar, A Johnson Matthey Company), and 3 g of $NaNO_3$ (NACALAI TESQUE, INC.) were stirred. Next, into the stirred mixture, 23 mL of $H_2SO_4$ (NACALAI TESQUE, INC.) was added, in an ice bath. The resultant mixture was held for 15 minutes, and then into the mixture, 3 g of $KMnO_4$ (Chameleon Reagent) was added. The mixture was stirred at room temperature for 12 hours. Next, 46 mL of the mixture was dissolved in pure water at 90° C., 100 mL of pure water at 60° C. was added into the resultant mixture, and the obtained mixture was stirred for 2 hours. The mixture was turned into a suspension in brown color.

When 3 mL of $H_2O_2$ (Santoku Chemical Industries Co., Ltd.) was added into the obtained suspension, the reaction was started, and a suspension in yellow color containing a graphite oxide was obtained. Next, the suspension in yellow color was subjected to ultracentrifugation at a rotation speed of 35000 rpm for 30 minutes several times until the pH reached 7. As a result, the graphite oxide in the suspension was exfoliated, and a graphene oxide had been formed. The graphene oxide was dispersed in 200 mL of pure water, and the resultant mixture was used as a precursor of graphene for a composite.

Next, 2 g of sodium dodecylbenzenesulfonate (SDBS, $C_{18}H_{29}NaO_3S$, Aldrich) was dissolved in 100 mL of pure water, and the resultant mixture was stirred at 25° C. for one hour until being transparent. Into the obtained mixture solution, 25 mg of single-walled carbon nanotubes (SWCNTs, Cheap Tube) were added, and the resultant mixture was subjected to ultrasonic treatment for two hours, and thus a SWCNT solution was obtained. The SWCNTs had a tube length in a range of 100 nm to 10 μm, and a tube diameter in a range of 1 nm to 10 nm. Next, 100 mL of the SWCNT solution (0.25 mg/mL) was mixed with 200 mL of a precursor of graphene (0.5 mg/mL), and the resultant mixture was stirred for one hour. Into the obtained mixture, 3 mL of hydrazine monohydrate ($H_2NH_2 \cdot H_2O$, Wako Pure Chemical Industries, Ltd.) was added, and the resultant mixture was held at 98° C. for 24 hours. Next, the mixture was filtered to obtain a product in a black slurry form. The product in a slurry form was washed with distilled water, and excessive SDBS and hydrazine monohydrate were removed. The resultant product was dried in a vacuum for 24 hours, and a powder in black color was obtained. It was confirmed that the powder in black color was a composite of graphene and carbon nanotubes by an X-ray diffraction, a scanning electron microscope (SEM), a transmission electron microscope (TEM), and an atomic force microscope (AFM). Further, the content of the carbon nanotubes in the composite was 25 wt %.

FIGS. 2(A)-2(D) show a TEM image, SEM images, and an AFM image of a composite in Example 1, respectively.

Figure 2:
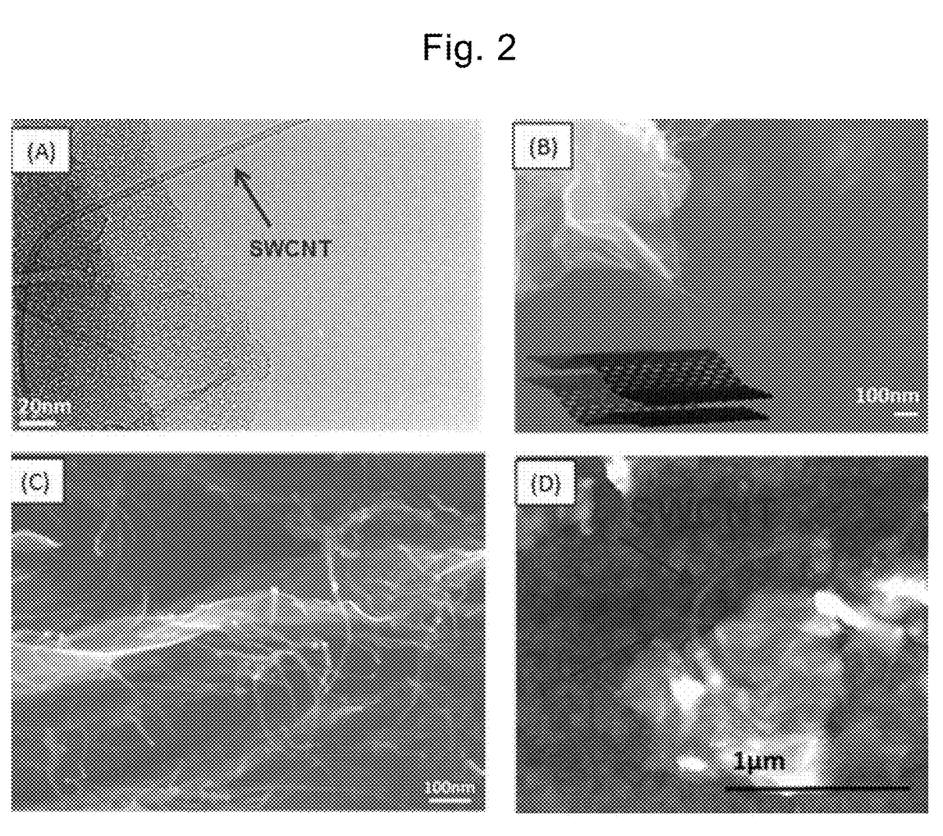
FIG. 2(A) is a TEM image of a composite in Example 1.
FIGS. 2(B) and 2(C) are SEM images of the composite in Example 1.
FIG. 2(D) is an AFM image of the composite in Example 1.

FIG. 2(A) is a TEM image of the composite, FIGS. 2(B) and 2(C) are SEM images of the composite, and FIG. 2(D) is an AFM image of the composite. As shown in FIGS. 2(A)-2(D), it was found that the graphene had a lateral dimension in a range of 100 m to 10 μm and a thickness in a range of 0.34 nm to 10 nm. Further, it was confirmed that the carbon nanotubes (SWCNTs) were positioned between graphene layers.

Next, a composite was doped with Li by an EC method.

Figure 3:
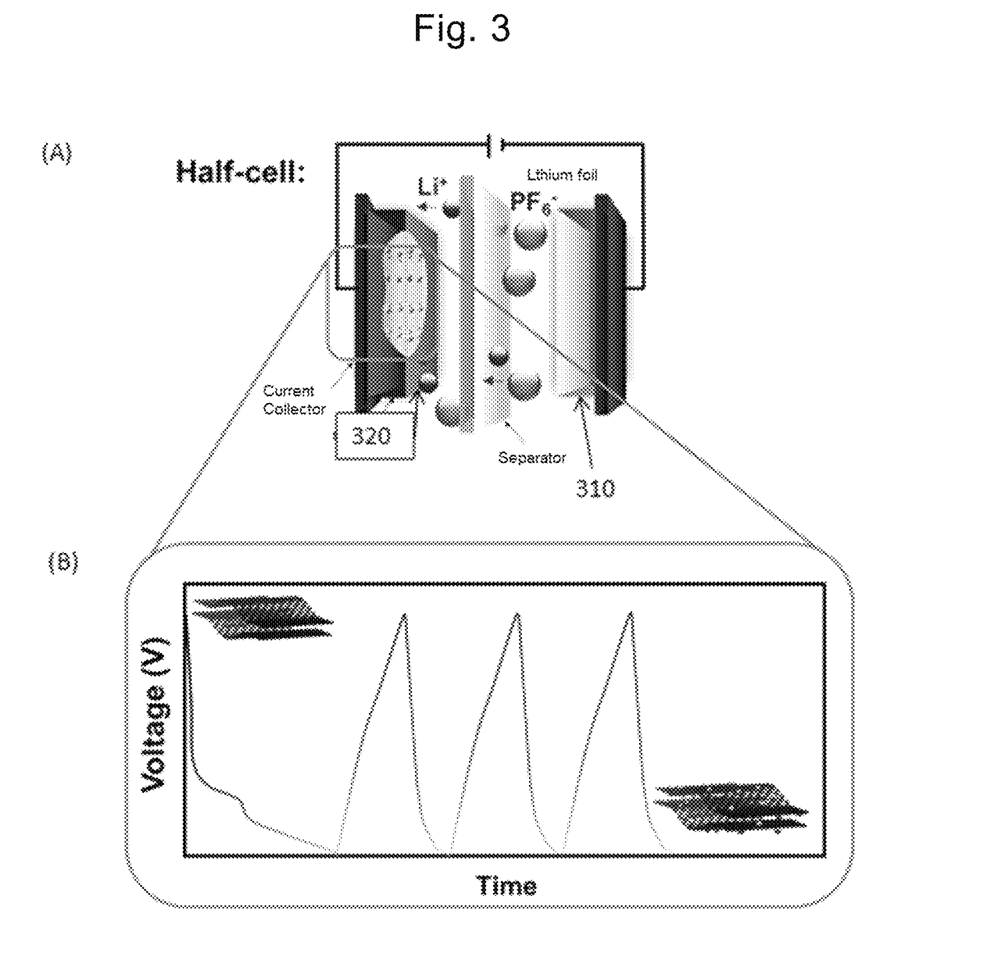
FIGS. 3(A) and 3(B) are schematic views showing a state in which a composite in Example 1 is doped with Li.

FIGS. 3(A) and 3(B) are schematic views showing a state in which a composite in Example 1 is doped with Li.

As shown in FIG. 3(A), a half cell having a lithium foil 310 as a lithium ion source and a composite 320 as an anode was prepared. In this regard, a composite 320 of an anode was prepared as follows. In 50 mL of ethanol (NACALAI TESQUE, INC.), 5 mg of a composite was dispersed, and the obtained dispersion was filtered with a porous membrane filter. As the porous membrane filter, a hydrophilic polytetrafluoroethylene membrane having a diameter of 47 mm (pore diameter: 0.2 μm, Merck Millipore) was used. Water and ethanol were removed, and the membrane was dried in a vacuum for 24 hours. The resultant membrane was cut to a circle having a diameter of 15 mm, and the cut circle was dried at 110° C. in a vacuum for 24 hours for use as an anode. Inside of the cell in which a lithium foil 310 and a composite 320 had been arranged was filled with a solution in which $LiPF_6$ had been dissolved at 1 mol/L in an organic solvent obtained by mixing ethylene carbonate (EC) and diethyl carbonate (DEC) at 1:1 (v/v). The lithium foil 310 and the composite 320 in the half cell were each connected to a power source.

The open circuit voltage (OCV) of the half cell was around 3 V. Discharge (insertion of lithium) was performed at a constant current density of 50 $mAg^{-1}$. It has been reported that in this discharge process, a solid electrolyte interface layer (SEI) is formed, and irreversible capacity is generated. The capacity of the anode showed stable behavior when the above-described discharge process was repeated three times. After the third discharge process, the electric potential of the anode reached 0.01 V, and thus the doping with lithium was confirmed. The anode was removed from the half cell, and used as an anode for a lithium ion capacitor. In this regard, the mass of the Li-doped composite to be used as the anode was 1 mg.

Next, a lithium ion capacitor (100 in FIG. 1) of a CR2032-type coin cell was prepared by using a composite (110 in FIG. 1) as a cathode, a Li-doped composite (120 in FIG. 1) as an anode, and $LiPF_6$ (130 in FIG. 1) as a Li-ion electrolyte. Inside a stainless steel cell, an anode made of a Li-doped composite, a polypropylene (PP) membrane (Celgard 2400) as a separator, and then a cathode made of a composite were arranged in this order.

The cathode made of a composite was prepared as follows. In 50 mL of ethanol (NACALAI TESQUE, INC.), 16 mg of a composite was dispersed, and the obtained dispersion was filtered with a hydrophilic polytetrafluoroethylene membrane having a diameter of 47 mm. Water and ethanol were removed, and the membrane was dried in a vacuum for 24 hours. The resultant membrane was cut to a circle having a diameter of 15 mm, and the cut circle was dried at 110° C. in a vacuum for 24 hours. The dried membrane was used as a cathode.

As a Li-ion electrolyte, a solution, in which $LiPF_6$ had been dissolved at 1 mol/L in an organic solvent obtained by mixing ethylene carbonate (EC) and diethyl carbonate (DEC) at 1:1 (v/v), is filled between the cathode and the anode, and a LIC of a coin cell was produced. In this regard, the assembly of the coin cell was performed in a glove box filled with Ar gas. In the LIC obtained in this way, the mass ratio of the anode to the cathode was 1 (mg)/2.5 (mg), and was adjusted to 0.4.

The electrochemical measurement of the coin cell was performed by using a VMP3 electrochemical station (Bio-Logic). At room temperature, cyclic voltammetry measurement, and galvanostatic charge and discharge measurement were performed to determine the rate characteristics and the energy density. The results are shown in FIGS. 4(A), 4(B), 5, 7, 8(A), and 8(B), and in Table 1.

Example 2

In Example 2, a LIC having a mass ratio of the anode to the cathode of 0.15 was produced. The LIC was produced in a similar manner as in Example 1 except that 43 mg of a composite was used for preparing the cathode. In the LIC obtained in this way, the mass ratio of the anode to the cathode was 1 (mg)/6.67 (mg), and was adjusted to 0.15. In a similar manner as in Example 1, cyclic voltammetry measurement, and galvanostatic charge and discharge measurement were performed to determine the rate characteristics and the energy density. The results are shown in FIGS. 6, 7, 8(A), and 8(B), and in Table 1.

Example 3

Figure 7:
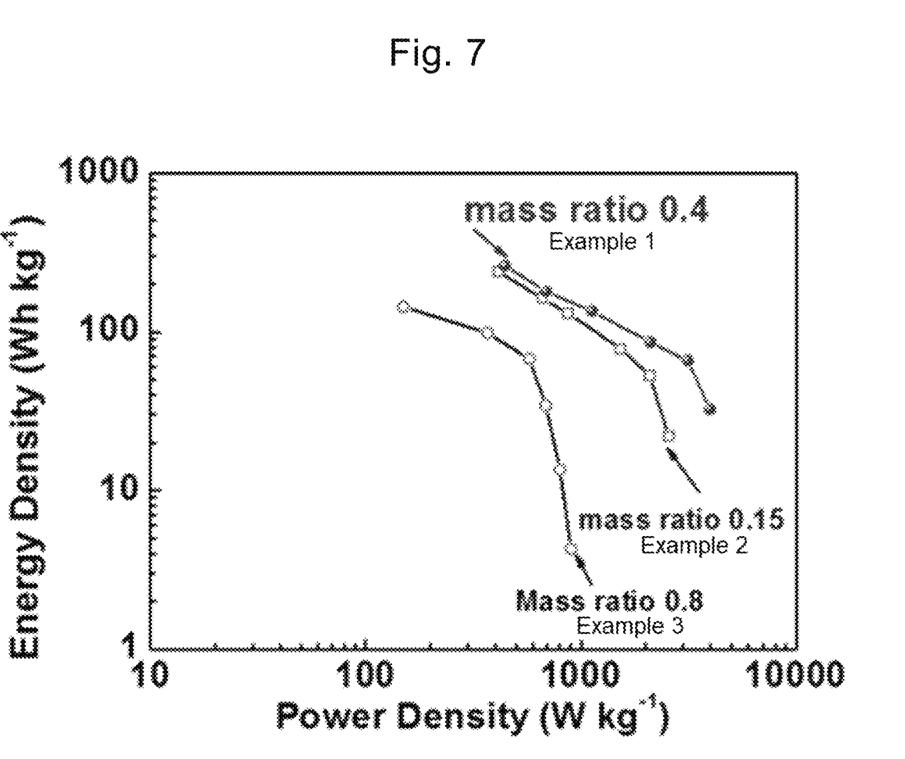
FIG. 7 is a graph showing power density dependence of energy density of LICs of Examples 1 to 3.
Figure 8:
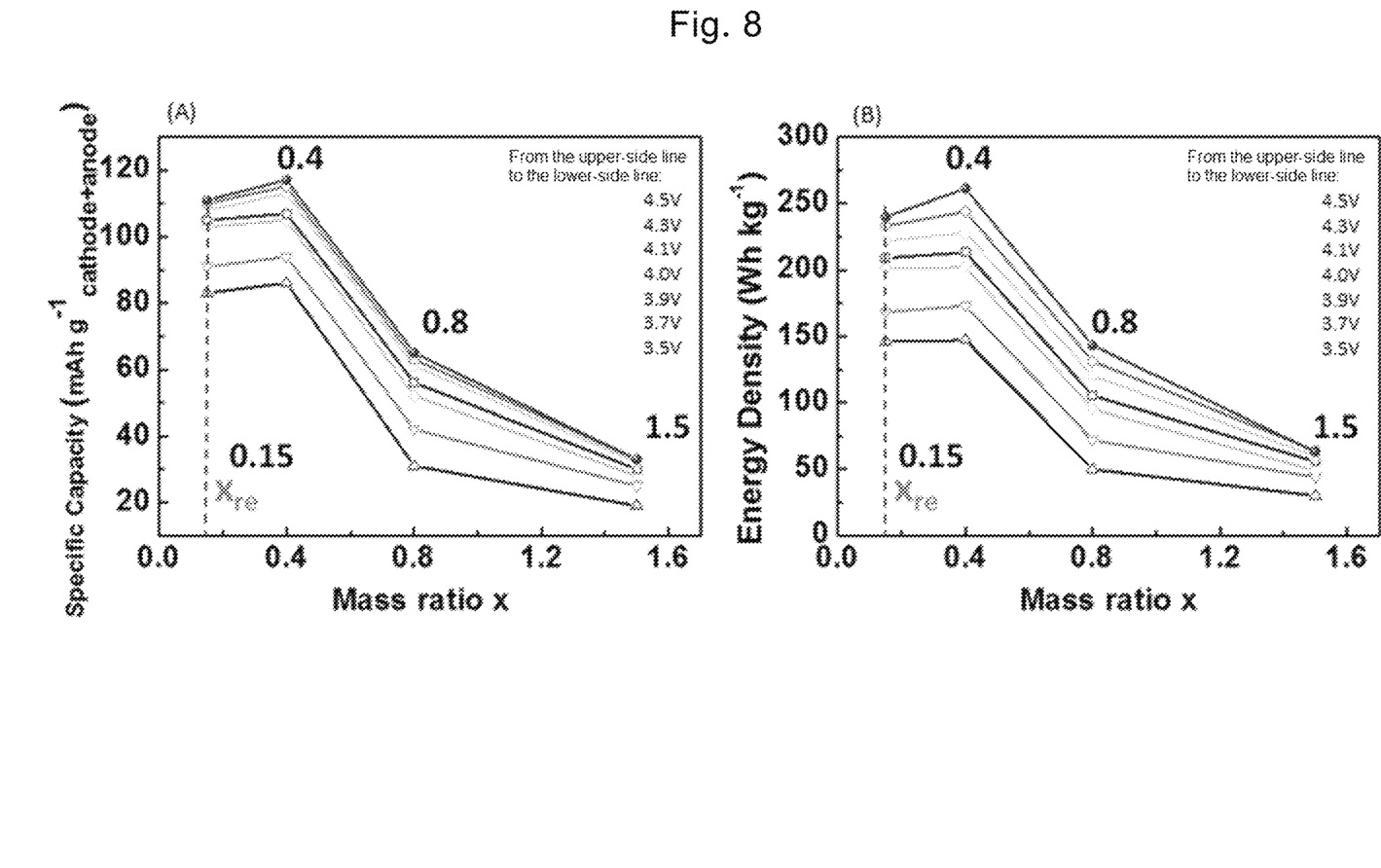
FIG. 8(A) is a graph showing mass ratio dependence of specific capacity of LICs of Examples 1 to 3, and Comparative Example 5.
FIG. 8(B) is a graph showing mass ratio dependence of energy density of the LICs of Examples 1 to 3, and Comparative Example 5.

In Example 3, a LIC having a mass ratio of the anode to the cathode of 0.8 was produced. The LIC was produced in a similar manner as in Example 1 except that 8 mg of a composite was used for preparing the cathode. In the LIC obtained in this way, the mass ratio of the anode to the cathode was 1 (mg)/1.25 (mg), and was adjusted to 0.8. In a similar manner as in Example 1, cyclic voltammetry measurement, and galvanostatic charge and discharge measurement were performed to determine the rate characteristics and the energy density. The results are shown in FIGS. 7, 8(A), and 8(B), and in Table 1.

Comparative Example 4

Comparative Example 4 was Example 10 in Patent Literature 1. In Patent Literature 1, the mass ratio of the anode to the cathode was not examined, and as usual, the mass ratio of the anode to the cathode was 1.0. The specific capacity was calculated from FIG. 31 of Patent Literature 1. The results are shown in Table 1.

Comparative Example 5

In Comparative Example 5, a LIC having a mass ratio of the anode to the cathode of 1.5 was produced. The LIC was produced in a similar manner as in Example 1 except that 4.3 mg of a composite was used for preparing the cathode. In the LIC obtained in this way, the mass ratio of the anode to the cathode was 1 (mg)/0.67 (mg), and was adjusted to 1.5. In a similar manner as in Example 1, cyclic voltammetry measurement, and galvanostatic charge and discharge measurement were performed to determine the rate characteristics and the energy density. The results are shown in FIGS. 8(A), and 8(B), and in Table 1.

The results of Examples and Comparative Examples in the above will be described.

Figure 4:
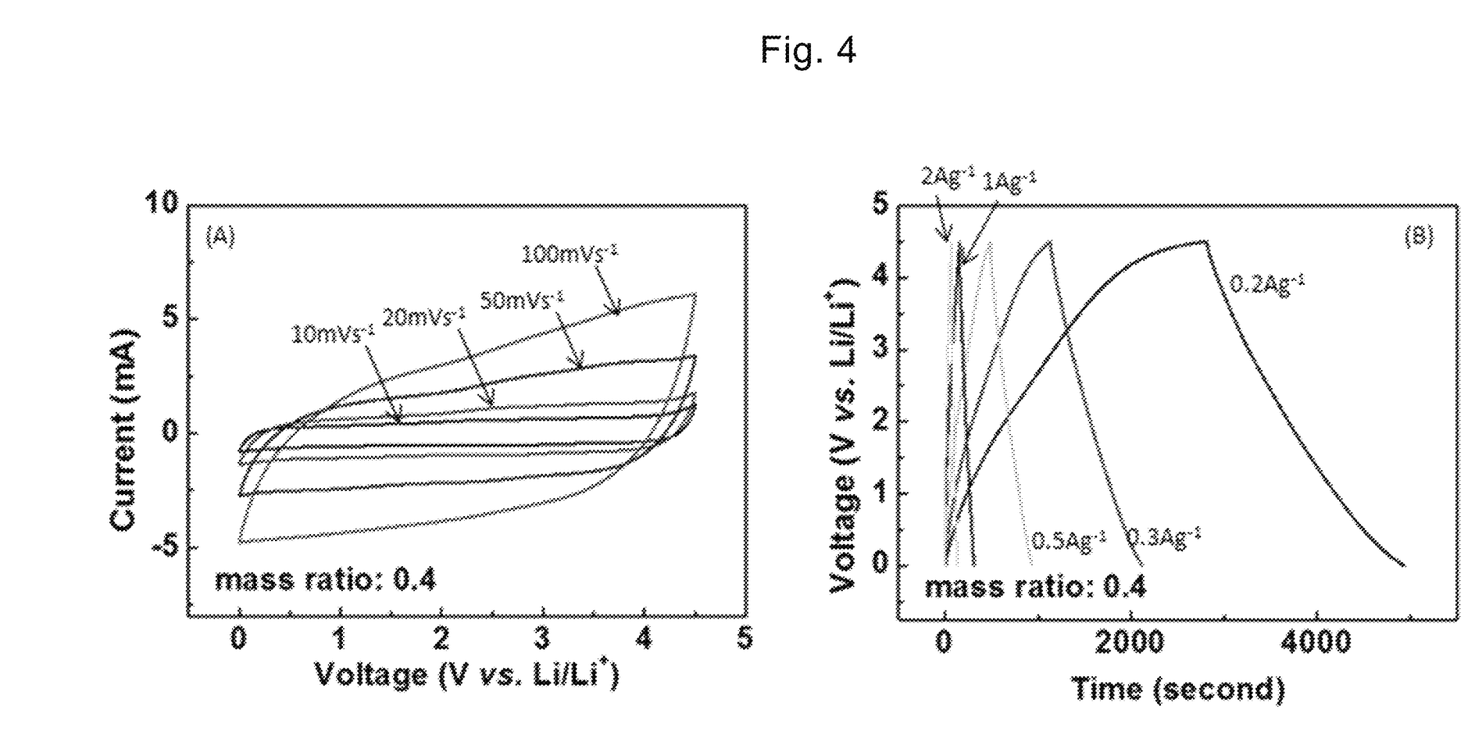
FIG. 4(A) shows cyclic voltammetry curves of a LIC of Example 1.
FIG. 4(B) shows galvanostat charge-discharge curves of the LIC of Example 1.

FIG. 4(A) shows cyclic voltammetry curves of a LIC of Example 1, and FIG. 4(B) shows galvanostat charge-discharge curves of the LIC of Example 1.

FIG. 4(A) shows a rectangular profile indicating a LIC, and the rectangular profile was stable even if the sweep rate was increased from 10 $mVs^{-1}$ to 100 $mVs^{-1}$. According to FIG. 4(B), favorable rate characteristics were shown, and the specific capacity of the LIC was 117 $mAhg^{-1}$ at a current density of 0.2 $Ag^{-1}$.

Although not shown, the cyclic voltammetry curves of LICs according to Examples 2 and 3 also showed rectangular profiles. The galvanostat charge-discharge curves of LICs according to Examples 2 and 3 also showed the tendency similar to that of Example 1, and the specific capacities of LICs of Examples 2 and 3 were 105 and 56 $mAhg^{-1}$, respectively at a current density of 0.2 $Ag^{-1}$.

Figure 5:
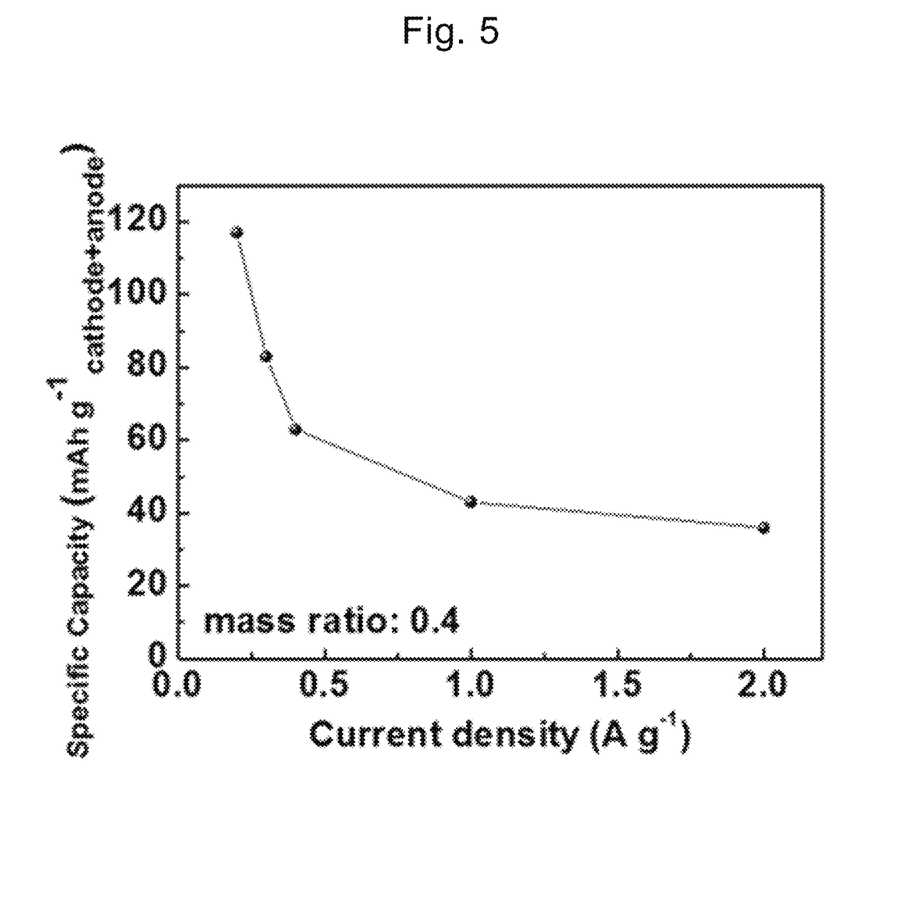
FIG. 5 is a graph showing a rate characteristic of a LIC of Example 1.

FIG. 5 is a graph showing a rate characteristic of a LIC of Example 1.

Figure 6:
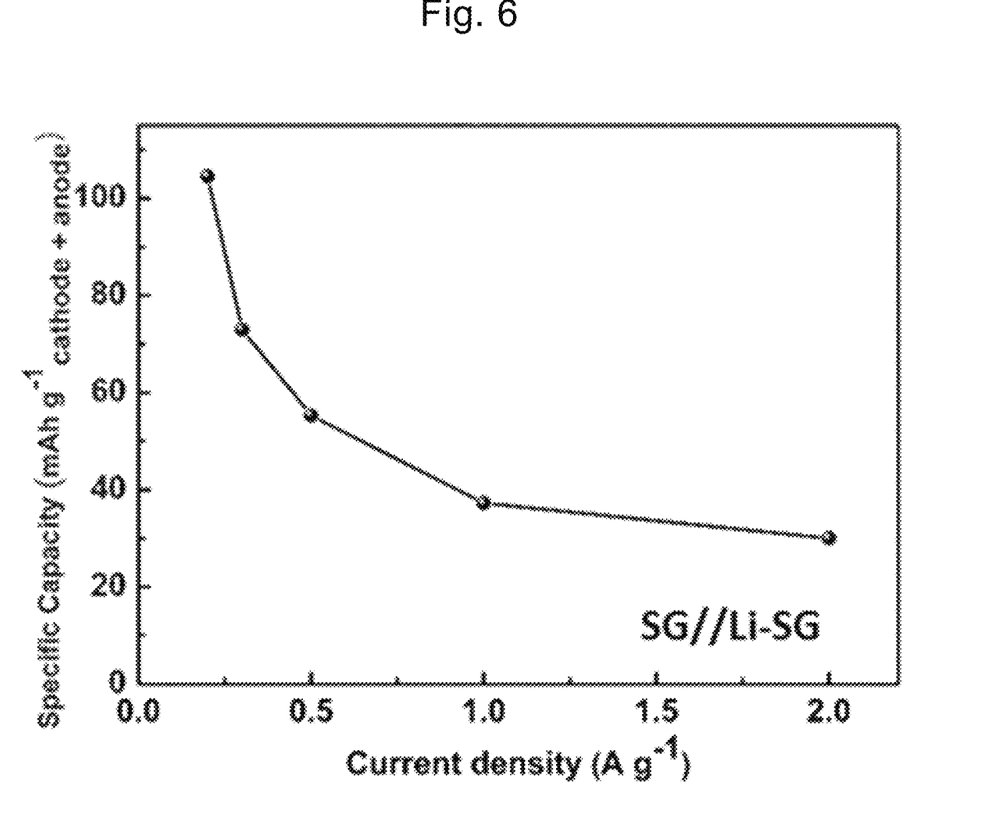
FIG. 6 is a graph showing a rate characteristic of a LIC of Example 2.

FIG. 6 is a graph showing a rate characteristic of a LIC of Example 2.

As shown in FIGS. 5 and 6, even when the current density was increased by 10 times (2 $Ag^{-1}$), the specific capacity of the LIC kept 30% or more of the initial capacity. Although not shown, the rate characteristic of a LIC of Example 3 also showed the similar tendency.

FIG. 7 is a graph showing power density dependence of energy density of LICs of Example 1 to 3.

As shown in FIG. 7, it can be understood that by controlling the mass ratio of an anode to a cathode, the LIC exhibits excellent energy density and excellent power density. For example, according to Example 1, when the power density was maintained at 445 $Wkg^{-1}$ in a voltage window of 0 V to 4.5 V, the energy density reached 261 $Whkg^{-1}$.

On the basis of the above-described results of FIGS. 4(A), 4(B), and 5 to 7, the mass ratio dependence of each of the specific capacity and the energy density is summarized in FIGS. 8(A) and 8(B), and in Table 1.

FIG. 8(A) is a graph showing mass ratio dependence of specific capacity of LICs of Examples 1 to 3, and Comparative Example 5, and FIG. 8(B) is a graph showing mass ratio dependence of energy density of the LICs of Examples 1 to 3, and Comparative Example 5.

FIG. 8(A) shows the dependence of the specific capacity of LICs on the mass ratio (x) of the anode to the cathode, and FIG. 8(B) shows the dependence of the energy density of the LICs on the mass ratio (x) of the anode to the cathode. As shown in FIGS. 8(A) and 8(B), as the voltage window was increased, both of the specific capacity and the energy density showed a tendency of increase.

As shown in FIG. 8(A), the specific capacity showed a peak at a mass ratio x of 0.4. When the x exceeded 0.4, the specific capacity was decreased, and when the mass of the anode was larger than the mass of the cathode, the specific capacity was decreased significantly to only 19 $mAhg^{-1}$. It is considered that this decrease in the specific capacity is caused by the decrease in the insertion depth of Li ions into the composite due to the excessive anodes.

As shown in FIG. 8(B), as in the case of FIG. 8(A), the energy density showed a peak at a mass ratio x of 0.4. Specifically, the energy density of a LIC of Example 1 having a mass ratio x of 0.4 reached 261 $Whkg^{-1}$ in a voltage window of 0 V to 4.5 V. When the x exceeded 0.4, the energy density was decreased, and when the mass of the anode was larger than the mass of the cathode, the energy density was decreased significantly to only 31 Whkg$^{-1}$.

TABLE 1

List of experimental conditions of Examples/Comparative Examples 1 to 5

| | Mass ratio of anode to cathode | Specific capacity (mAh/g)@ 0.2 Ag$^{-1}$ | Energy density (Wh/kg) | Power density (W/kg) |
|---|---|---|---|---|
| Example 1 | 0.4 | 107 | 213 | 396 |
| Example 2 | 0.15 | 105 | 209 | 400 |
| Example 3 | 0.8 | 56 | 105 | 378 |
| Comparative Example 4 | 1.0 | 54 | — | — |
| Comparative Example 5 | 1.5 | 31 | 56 | 367 |

* The values of specific capacity, energy density, and power density are values in a voltage window of 4 V.

Table 1 shows values of energy density and power density when the voltage window is 4 V. As shown in FIGS. 8(A) and 8(B), and in Table 1, it was indicated that in a LIC using a cathode made of a composite of graphene and carbon nanotubes, and an anode made of a Li-doped composite of graphene and carbon nanotubes, the mass of the cathode is preferably larger than the mass of the anode, that is, the mass ratio of the anode to the cathode is preferably larger than 0 and less than 1.0. Further, it was indicated that in order to achieve high specific capacity and high energy density, the mass ratio is in a range of 0.15 or more and less than 0.8, and in order to reliably achieve high specific capacity and high energy density, the mass ratio is preferably in a range of 0.15 or more and less than 0.6.

INDUSTRIAL APPLICABILITY

The lithium ion capacitor (LIC) according to the present invention uses a cathode using a composite of graphene and carbon nanotubes, and an anode obtained by doping a composite of graphene and carbon nanotubes with Li, and by controlling the mass ratio of the anode to the cathode, high specific capacity and high energy density can be achieved, and therefore, the LIC is advantageous in the capacitor industry and the battery industry, which use a LIC.

REFERENCE SIGNS LIST

100 Lithium ion capacitor
110 Cathode
120 Anode
130 Li-ion electrolyte
140 Graphene
150 Carbon nanotubes
160 Li ions
310 Lithium foil
320 Composite

The invention claimed is:

1. A lithium ion capacitor comprising a cathode, an anode arranged apart from the cathode, and a Li-ion electrolyte which is filled between the cathode and the anode, wherein
the cathode is made of a composite of graphene and carbon nanotubes,
the anode is made of a Li-doped composite of graphene and carbon nanotubes,
a mass ratio of the anode to the cathode is larger than 0 and less than 1.0, and
in the composite constituting the cathode and the composite constituting the anode, the carbon nanotubes are contained in a range of 17 wt % or more and less than 33 wt %, the carbon nanotubes are positioned between graphene layers, and the carbon nanotubes and the graphene are assembled.

2. The lithium ion capacitor according to claim 1, wherein the mass ratio of the anode to the cathode is in a range of 0.15 or more and less than 0.8.

3. The lithium ion capacitor according to claim 2, wherein the mass ratio of the anode to the cathode is in a range of 0.15 or more and less than 0.6.

4. The lithium ion capacitor according to claim 1, wherein, in the composite constituting the cathode and the composite constituting the anode, the carbon nanotubes are contained in a range of 20 wt % or more and less than 30 wt %.

5. The lithium ion capacitor according to claim 1, wherein the graphene has a thickness in a range of 0.34 nm or more and less than 10 nm.

6. The lithium ion capacitor according to claim 1, wherein the graphene has a lateral length in a range of 100 nm or more and less than 10 μm.

7. The lithium ion capacitor according to claim 1, wherein, in the composite constituting the cathode and the composite constituting the anode, the carbon nanotube is a single-walled carbon nanotube (SWNT).

8. The lithium ion capacitor according to claim 7, wherein the carbon nanotube has a tube length of 100 nm or more and less than 10 μm.

9. The lithium ion capacitor according to claim 1, wherein the Li-ion electrolyte contains one or more substances selected from a group consisting of $LiClO_4$, $LiPF_6$, $LiBF_4$, $LiPOF_2$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, and $LiN(CF_3CF_2CO)_2$.

* * * * *